United States Patent [19]
Holko

[11] 3,798,748
[45] Mar. 26, 1974

[54] DIFFUSION WELDING

[75] Inventor: Kenneth H. Holko, Strongsville, Ohio

[73] Assignee: The United States of America as represented by the Administrator of the National Aeronautics and Space Administration, Washington, D.C.

[22] Filed: Sept. 29, 1972

[21] Appl. No.: 293,726

Related U.S. Application Data

[63] Continuation-in-part of Ser. No. 289,033, Sept. 14, 1972, Pat. No. 3,758,741.

[52] U.S. Cl.................. 29/487, 29/494, 29/498, 29/504
[51] Int. Cl............................................ B23k 31/02
[58] Field of Search............... 29/487, 498, 504, 494

[56] References Cited
UNITED STATES PATENTS

| | | | |
|---|---|---|---|
| 2,834,102 | 5/1958 | Pflumm et al. | 29/498 X |
| 3,025,592 | 3/1962 | Fischer et al. | 29/498 X |
| 3,530,568 | 9/1970 | Owezarski et al. | 29/504 X |
| 3,552,898 | 1/1971 | Bird et al. | 29/504 X |
| 3,646,591 | 2/1972 | Thomas et al. | 29/487 |
| 3,672,037 | 6/1972 | Kindlimann | 29/504 X |
| 3,680,197 | 8/1972 | Blum et al. | 29/498 X |
| 3,711,937 | 1/1973 | Emley | 29/487 |
| 3,714,702 | 2/1973 | Hammond | 29/504 X |

OTHER PUBLICATIONS

Kaarlela et al., "Alloy Effects in the Low–Pressure Diffusion Bonding of Superalloys," Welding Journal Research Supplement, 6/67, pp. 283–S to 287–S.

Garrett et al., "Broad Applications of Diffusion Bonding," NASA, CR–409, March 1966, pp. 114–115, Technical Library.

*Primary Examiner*—J. Spencer Overholser
*Assistant Examiner*—Ronald J. Shore
*Attorney, Agent, or Firm*—N. T. Musial; G. E. Shook; J. P. Manning

[57] ABSTRACT

Dispersion-strengthened nickel alloys are sanded on one side and chemically polished. This is followed by a single-step welding process wherein the polished surfaces are forced into intimate contact at 1,400°F for one hour in a vacuum. Diffusion, recrystallization, and grain growth across the original weld interface are obtained during postheating at 2,150°F for two hours in hydrogen.

8 Claims, No Drawings

DIFFUSION WELDING

RELATED APPLICATION

This application is a continuation-in-part of copending application, Ser. No. 289,033 which was filed Sept. 14, 1972, now U.S. Pat. No. 3,758,741.

BACKGROUND OF THE INVENTION

The invention described herein was made by an employee of the United States Government and may be manufactured and used by or for the Government for governmental purposes without the payment of any royalties thereon or therefor.

PRIOR ART

This invention is concerned with using solid-state welding to achieve strong welds with metals that undergo recrystallization upon heating. The invention is particularly directed to improving the welding process disclosed in copending application, Ser. No. 289,033. This improved process has the advantages of shorter welding time, lower welding temperature, lower welding pressure, and a simpler and more reproducible surface preparation procedure.

Conventional brazing and fusion welding methods, such as resistance spot welding, have been used to join certain alloys. Fusion welding and brazing methods result in weldments having approximately 50 percent of the parent metal strength.

Brazing dispersion-strengthened nickel alloys, such as $Ni-ThO_2$, $Ni-Cr-ThO_2$, $Ni-Mo-ThO_2$, and $Ni-Cr-Al-ThO_2$, involves degradation of parent metal strength. Diffusion occurring between the braze alloy and parent metal at elevated temperatures causes porosity to form in the parent metal as well as in the braze alloy. The thoria dispersion, which is critical to the development of strength, may be destroyed. Also the texture produced by thermo-mechanical processing may be lost. In addition, the braze alloy is not as strong at elevated temperatures as the dispersion-strengthened nickel alloy. All of these factors can contribute to weak brazements.

Fusion welding necessarily involves melting of the dispersion-strengthened nickel alloy, and the thoria dispersion is lost. Thus the strengthening effect of the thoria is lost, and the weldment is relatively weak.

Solid-state welding using both direct resistance heating at the joint and indirect heating from a resistance heated element has been proposed for joining alloys. Solid-state welding is desirable because melting is avoided and foreign material need not be introduced at the joint. However, conventional solid-state welds have proven to be weak and brittle when tested at elevated temperatures. A thin recyrstallized band of small grains forms at a continuous weld line which acts as a boundary. The continuous weld line and the small grains cause weakness at elevated temperatures. This results in joint failure at low stresses. Typically, joint efficiency is 0 to 60 percent. Also unwelded areas occur sporadically at the weld line.

A two-step welding process described in copending application, Ser. No. 289,033 has been satisfactory for welding specially processed dispersion-strengthed alloys that have had their mating surfaces specially prepared. However, the two-step welding cycle used involves long times of over three hours and high temperatures around 2175°F. Therefore the two-step welding cycle would be costly if applied to hardware manufacture. The specially processed material is in the unrecrystallized condition and is very difficult to form at room temperature. Also, the mating surfaces require an involved sanding and electropolishing procedure to insure flatness and freedom of stored energy.

SUMMARY OF THE INVENTION

The present invention represents an improvement over the process disclosed in application, Ser. No. 289,033. One surface of each member is prepared by sanding with 320-grit paper and chemically polishing. Upon heating to 1,400°F in vacuum, a pressure between 20,000 psi and 40,000 psi is applied for one hour. Post-heating at 2150°F for two hours in a hydrogen furnace after welding is recommended. By selecting a predetermined pressure in this range uncrystallized alloys can be welded to themselves or to recrystallized alloys by this process.

OBJECTS OF THE INVENTION

It is, therefore, an object of the present invention to provide a shorter single-step method of solid-state welding dispersion-strengthened materials at a lower temperature without losing strength in the parent material or at the weld.

Another object of the invention is to provide an improved method of welding dispersion-strengthened alloys in which the mating surfaces are prepared in an improved manner.

A further object of the invention is to provide a method of solid-state welding unrecrystallized alloys to recrystallized alloys without producing a weld line at the interface.

These and other objects of the invention will be apparent from the specification which follows.

DESCRIPTION OF THE PREFERRED EMBODIENT

Sheets of a nickel-base alloy, commercially designated as TD-NiCr, were welded in accordance with the present invention to illustrate the advantages of the improved enhanced diffusion welding technique. Normally commercial TD-NiCr is recrystallized, but specially processed sheets of this material which were unrecrystallized were obtained. The special processing consisted of omitting the final recrystallization heat treatment that is normally given to commercial TD-NiCr after thermomechanical processing. Thus, the specially processed TD-NiCr was in the unrecrystallized condition in which the grain size is extremely fine. The sheets had a nominal thickness of 0.4 millimeter (0.015 in.).

Specially processed sheets were welded to each other. Commercial sheets were also welded to each other. Likewise the dissimilar combination of specially processed and commercial TD-NiCr sheets was welded. The specially processed material welded to itself and the dissimilar material combinations were preferred over the commercial material welded to itself. This was because the weld line could be eliminated in the preferred weldments. Also creep-rupture fracture of weldments took place in the parent material away from the weld line and the creep-rupture shear strength of the weldments was higher than commercial TD-NiCr weldments. With the commercial TD-NiCr, a semicontinuous weld line resulted and creep-rupture shear fracture took place in the weld line indicating a plane of weakness.

TD-NiCr has a nominal composition of 20 percent chromum, 2 percent thoria and the remainder nickel. The alloy has good high temperature strength and oxidation resistance. The TD-NiCr derives its high temperature strength from mechanical working of the Ni-20 weight percent Cr matrix which contains a fine dispersion of $ThO_2$ particles. Use of this metal has been suggested for applications where metal temperatures may reach about 2,200°F in an oxidizing environment. These metals have potential applications in jet engine components and heat shield panels for space shuttle vehicles.

The commercial TD-NiCr sheets which were also welded for comparison purposes had the same thickness. Commercial TD-NiCr is made from the special processed material by recrystallization at 2,150°F for two hours. This heat treatment is termed as stress relieving.

The commercial material is more ductile at room temperature than the specially processed material, and it is more formable. The specially processed material must be formed at elevated temperatures between about 1,400°F and 1,500°F where the material has adequate ductility. This hot forming is expensive, and the preference is to form at room temperatures if possible. Therefore the commercial material is preferred for use where shaping to a predetermined configuration is required.

The advantage of being able to diffusion weld specially processed to commercial TD-NiCr is twofold. First, if in a two component assembly, such as a corrugation-stiffened heat shield, one component requires extensive forming, e.g., the corrugation, it can be made from the more formable commercial TD-NiCr. Likewise the component least formed, e.g., the face sheet, can be made from the less formable specially processed TD-NiCr. Second, in applications where all the material or materials must be severely formed, the specially processed TD-NiCr could be used as an interlayer between a severely formed commercial TD-NiCr.

A vacuum hot press was used to make diffusion welding lap welds in both the commercial and the specially processed TD-NiCr. The weld specimens were radiantly heated by a tantalum resistance heater. Sintered tungsten rams were used to transmit welding force from a 25 ton hydraulic press to the weld specimens through Inconel X or TD-NiCr weld tooling. A pressure of $2 \times 10^{-5}$ torr was maintained in the vacuum chamber during welding.

Both types of TD-NiCr sheets in the as-received condition had 120-grit sanded surfaces with the surfaces scratches parallel to the principal rolling direction. The weld specimens were prepared by sanding only the side to be welded with 320-grit paper and cleaning with a detergent.

The surfaces were then chemically polished by dipping the specimen in a polishing solution at 90°C for three minutes. This solution contained 92% HCl, 3% $HNO_3$, and 5% $H_2SO_4$. The compositions are in volume percents.

After rinsing with distilled water the specimens were dipped in another polishing solution at 90°C for three minutes. This solution comprised 40% $HNO_3$, 20% HF, and 40% $H_2O$. Again all the compositions are in volume percents.

The specimens were finally rinsed in distilled water and then rinsed with methyl alcohol. The specimens were stored in trichlorotrifluorethane to minimize oxidation. This surface preparation procedure was very easy to perform, and the specimens were finished in a reproducible manner. The specimens were overlapped approximately one-half inch, and a vacuum of $2 \times 10^{-5}$ torr was attained in the weld chamber. The specimens were heated to the welding temperature, the welding force was applied, and diffusion welding was achieved.

A single-step weld cycle shown in TABLE I produced the best welds. This cycle consisted of heating to 1400°F where both specially processed and commercial TD-NiCr have adequate ductility for diffusion welding and forcing the surfaces together for one hour in a vacuum of $2 \times 10^{-5}$ torr.

Post heating at 2150°F for two hours in hydrogen was utilized to recrystallize the specially processed material and dissimilar material weldments causing grain growth and elimination of the weld line. Post heating is believed to strengthen the commercial material weldments by increased diffusion across the weld line.

TABLE I—WELD CYCLES

| Material | Temp. °F. | Pressure psi | Time hr | Vacuum torr |
|---|---|---|---|---|
| Specially processed | 1400 | 20,000 | 1.0 | $2 \times 10^{-5}$ |
| Commercial | 1400 | 40,000 | 1.0 | $2 \times 10^{-5}$ |
| Specially processed to commercial | 1400 | 30,000 | 1.0 | $2 \times 10^{-5}$ |

Other welds were made using the cycle shown in TABLE II in a vacuum of $2 \times 10^{-5}$ torr. The welds produced with these cycles were not as good as those using the weld cycle shown in TABLE I.

TABLE II—OTHER WELD CYCLES

| Material | Temperature °F. | Pressure psi | Time hr |
|---|---|---|---|
| Specially processed | 1400 | 10 | 1 |
|  |  | 20 |  |
|  |  | 25 |  |
|  |  | 30 |  |
|  |  | 35 |  |
| Commercial | 1400 | 30 | 1 |
|  |  | 35 |  |
|  |  | 40 |  |
|  |  | 45 |  |
|  |  | 50 |  |
|  | {1400/2175} | {40/2} | 1/1 |
|  | {1400/2175} | {50/2} | 1/1 |
| Specially processed to commercial | 1400 | 20 | 1 |
|  |  | 30 |  |

The weld cycles shown in TABLE I were used to prepare diffusion weld specimens for creep-rupture shear testing at 2,000°F in air. The results of the creep-rupture shear tests are shown in TABLE III. It is evident from TABLE III that diffusion welds in specially processed materials and the dissimilar combination had excellent creep-rupture shear strength and failure occurred in the parent material, away from the weld line. While diffusion welds in the commercial TD-NiCr were almost as strong, failure often occurred at the weld line.

TABLE III.—CREEP-RUPTURE SHEAR STRENGTHS OF DIFFUSION LAP WELDS IN 0.4 MILLIMETER (0.015 IN.) THICK TD-NiCr SPECIMENS AT 1,100° C. (2012° F.)

| Material | Surface preparation | Shear stress, p.s.i. | Time (hrs.) | Failure location/mode of fracture |
|---|---|---|---|---|
| Specially processed | 320-grit sanded | 3,100 | 14.6 | Parent material/tensile. |
| | do | 3,100 | 7.0 | Do. |
| | do | 2,500 | 16.2 | Do. |
| | do | 3,080 | 9.0 | Do. |
| | do | 2,400 | 29.0 | Do. |
| | do | 2,500 | 24.4 | Do. |
| | do | 2,300 | 236+ | Test discontinued, no failure. |
| | do | 2,350 | 310+ | Parent material/tensile at R.T. on removal. |
| | do | 2,980 | 95.0 | Parent material/shear. |
| | 600-grit sanded | 2,770 | 0.1 | Parent material/tensile and shear. |
| | do | 2,980 | 125.0 | Parent material/tensile. |
| | do | 2,810 | 91.0 | Do. |
| | do | 3,200 | 0.25 | Parent metal/shear. |
| Commercial material | 320-grit sanded | 2,500 | 310+ | Weld/shear on cooling. |
| | do | 2,500 | 145.0 | Weld/shear. |
| | do | 2,500 | 316+ | Weld/shear on cooling. |
| | do | 2,700 | 0.1 | Weld/shear. |
| | 600-grit sanded | 1,800 | 164+ | Parent material/tensile on cooling. |
| | do | 3,090 | F.O.L. | Weld/shear. |
| | do | 3,020 | 1.7 | Do. |
| | do | 2,760 | 18.6 | Parent metal/tensile and shear. |
| Specially processed to commercial | As received/600-grit sanded | 2,680 | 160+ | Do. |
| | 600-grit sanded/as received | 2,720 | 260+ | Do. |
| | do | 2,690 | 138.4 | Parent material tensile. |

All of the welded specimens in TABLE III were postheated at 2,150°F for two hours in hydrogen prior to testing. One of the welded specimens failed on loading (F.O.L.).

All of the specimens were chemically polished after sanding. In the last group in which the specially processed material is welded to the commercial material the surface preparation of the specially processed material appears first.

While the preferred embodiment of the invention has been described it will be apparent that various modifications may be made to the disclosed process without departing from the spirit of the invention or the scope of the subjoined claims.

I claim:

1. A method of solid-state welding a pair of dispersion-strengthened nickel alloy members that undergo recrystallization and grain growth upon heating comprising the steps of
   providing mating surfaces on said members to be welded that are flat and free of stored energy thereby preventing the formation of small grains,
   assembling said members with said mating surfaces in intimate contact in a vacuum of about $2 \times 10^{-5}$ torr,
   applying a pressure to said assembled members in said vacuum,
   heating the assembled members to a temperature of about 1400° F for about one hour to cause diffusion welding, and
   postheating at a temperature of about 2150° F for about two hours after diffusion welding to cause increased diffusion, recrystallization, and grain growth across the original interface.

2. A method of solid-state welding as claimed in claim 1 wherein the members are of a nickel alloy selected from a group consisting of Ni-ThO$_2$, Ni-Cr-ThO2, Ni-Mo-ThO$_2$, and Ni-Cr-Al-ThO$_2$.

3. A method of solid-state welding as claimed in claim 2 wherein at least one of the members is of a dispersion-strengthened nickel alloy that is unrecrystallized prior to heating.

4. A method of solid state welding as claimed in claim 1 wherein the applied pressure is between about 20,000 psi and about 40,000 psi.

5. A method of solid state welding as claimed in claim 4 wherein the members are postheated in hydrogen.

6. A method of solid-state welding as claimed in claim 1 wherein both members are unrecrystallized prior to welding and a pressure of 20,000 psi is applied.

7. A method of solid-state welding as claimed in claim 1 wherein one of the members is uncrystallized and the other member is recrystallized prior to welding and a pressure of 30,000 psi is applied.

8. A method of solid-state welding as claimed in claim 1 wherein both members are recrystallized prior to welding and a pressure of 20,000 psi is applied.

* * * * *